(12) United States Patent
Condon et al.

(10) Patent No.: US 6,456,410 B1
(45) Date of Patent: *Sep. 24, 2002

(54) OPTICAL DATA COMMUNICATION SYSTEM AND METHOD

(75) Inventors: Joseph Henry Condon, Summit; Thomas Douglas Selkirk Duff, Scotch Plains; Milan F. Jukl, Neshanic Station; Charles Robert Kalmanek, Jr., Short Hills, all of NJ (US); Bart Nicholas Locanthi, III, Beaverton, OR (US); Joseph Peter Savicki, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/360,513

(22) Filed: Dec. 21, 1994

(51) Int. Cl.$^7$ ................................. H04J 14/08
(52) U.S. Cl. ................ 359/135; 359/137; 359/136; 359/172; 370/321
(58) Field of Search ................ 359/172, 135–139; 370/321

(56) References Cited

U.S. PATENT DOCUMENTS

| 5,210,871 | A | * | 5/1993 | Lala et al. ................... 395/650 |
| 5,274,841 | A | * | 12/1993 | Natarahan et al. .......... 455/33.4 |
| 5,724,168 | A | * | 3/1998 | Oschmann et al. .......... 359/172 |

* cited by examiner

*Primary Examiner*—Leslie Pascal

(57) ABSTRACT

A system and method that overcomes the deficiencies of prior optical data communication systems for local area networks by employing a centralized controller in conjunction with a robust protocol and contention scheme. This combination facilitates the transport of data between a number of optical nodes without collision. The invention is particularly suited to transmissions between several mobile optical nodes and one or more stationary network infrared collector/transmitters, allowing communication with the network as the mobile nodes roam from the vicinity of one network infrared collector/transmitter to the next.

19 Claims, 1 Drawing Sheet

OPTICAL DATA COMMUNICATION SYSTEM AND METHOD

TECHNICAL FIELD

The invention relates to the optical transmission and reception of digital data and, more particularly, to a system and method for providing such in a mobile user environment.

BACKGROUND OF THE INVENTION

Within modem data systems local area networks ("LANs") which facilitate user-to-user or user-to-computer communications are common place. Typically systems comprise a central network connected by either dedicated connection lines or a general purpose telecommunication system to various user terminals. These networks employ various data protocols that allow information to be exchanged among the user terminals. While existing LAN architectures and protocols allow users a good deal of flexibility, users are still limited in mobility by the connection (be it wire or optical fiber) which tethers them to the network server. In addition, these "hard-wire" connections also detract from the ease with which a given LAN can be reconfigured. If a terminal is to be added or relocated, additional connection lines must be run—Usually a rather time consuming and cost intensive operation.

Previous systems have attempted to solve this mobility problem by providing either a radio and/or infrared optical link between mobile user terminals and LANs. Typically, data communications over the radio-based systems were subject to electromagnetic interference, and previous infrared optical systems have lacked an effective central control to avoid and mediate data collisions. In particular, present infrared-based systems have typically had nodes "listen-while-talking" so that transmissions could be terminated if a data collision occurred. This permits the system to recover quickly after a collision occurs, but does nothing to avoid collisions.

SUMMARY OF THE INVENTION

The present invention overcomes the deficiencies of prior optical data communication systems for LANs by employing a centralized controller in conjunction with a robust protocol and contention scheme. This combination enables the invention to facilitate the optical transport of data between a number of nodes without collision. The invention is particularly suited to optical transmissions between several mobile nodes and one or more stationary network nodes, allowing communication with the network as the mobile nodes roam from the vicinity of one network node to the next.

DETAILED DESCRIPTION OF THE INVENTION

Figure 1A:
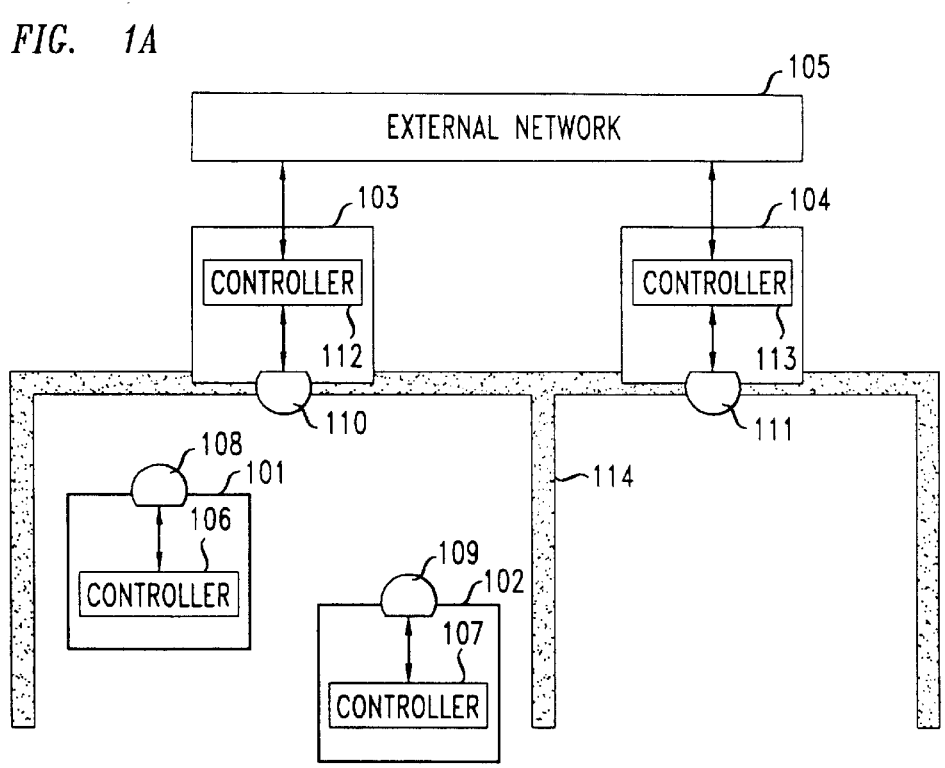
FIG. 1A is a simplified diagram of an exemplary arrangement that facilitates the practice of the invention.

FIG. 1A shows a simplified diagram of an exemplary LAN data communication system facilitating the practice of the invention. The system includes mobile nodes 101 and 102, station nodes 103 and 104, and external network 105. Mobile nodes 101 and 102 each include a controller (106 and 107, respectively) and an infrared collector/transmitter (108 and 109, respectively). An infrared collector/transmitter (110, 111) is also mounted upon each of the station nodes, and connected to a controller (112, 113) within each station node. Controller 112 (within station node 103) and controller 113 (within station node 104) are each linked to external network 105. The links between the station controllers and the external network can be coaxial cable, twisted pair, or optical fiber. As shown, barrier 114, which is opaque to infrared signals, optically isolates station node 104 from station node 112 and from mobile nodes 101 and 102. This opaque barrier will typically be the walls, ceilings, and floors of one or more rooms within a building serviced by the data communication network.

Data communications between external network 105 and mobile nodes 101 and 102 are facilitated by station node 103 via infrared signals that are emitted from and received by the various infrared collector/transmitters (108, 109, 110, 111). Controllers 106, 107 and 112 each contain a data processor adapted to generate and receive digital communications as coded infrared signals that are produced by an infrared light emitting diode ("LED") and detected by an infrared sensitive photodetector (such processors are well-known in the art). Each infrared collector/transmitter includes an infrared LED and photodetector arrangement suited to accommodate data communications via airborne infrared signaling (where logical 1's are represented by a state of infrared illumination, and logical 0's are represented by a state where no infrared light is produced). Information is passed between mobile nodes 101 and 102 and station node 103 via asynchronous transfer mode ("ATM") data packets having the following format and structure:

Preamble—Two identical 9-bit data segments having even parity that serve to facilitate the framing of the data packets, and to uniquely identify particular station nodes. These preamble data segments are only transmitted by station nodes.

Contention—A 9-bit data segment, ending in a 0 bit, and carrying information employed to arbitrate among multiple nodes.

Data Payload—A sequence of 53 9-bit data segments having odd parity and carrying information to be transferred to or from a mobile node; and Packet Terminator—A 0 bit that identifies the end of a packet.

The station and mobile nodes are specially adapted to detect only transitions from one logical level to another, as opposed to the presence or absence of infrared illumination. This transition or "edge" detection reduces the system's susceptibility to noise. For example, a signal carrying the information of 011 would consist of a one bit period of no illumination, followed by two bit times of illumination. Assuming the bit received just previous to this signal was a logical 1, the photodetector would sense a 1-to-0 transition at the beginning of the first bit, and a 0-to-1 transition at the beginning of the second bit. No transition would be sensed for the third bit. A controller receiving this information would identify the first bit as a 0 and the following two bits as 1's.

In the data communication system of FIG. 1A each station node periodically broadcasts an availability signal via its infrared collector/transmitter. The interval between these periodic broadcasts is equal to the duration of the ATM data packets ($t_{packet}$) that are normally transmitted by mobile nodes within the data communication system. These availability signals are requests for one or more nodes to contend for access, to an infrared link, and subsequently send data (either from a mobile node to a station node, or from a station node to a mobile node). Each availability signal consists of a preamble sequence (two identical 9-bit data segments having odd parity) that uniquely identify the particular station node broadcasting the availability signal with respect to any adjacent station nodes (station node 103 would be considered adjacent to station node 104). Mobile nodes can readily distinguish these availability signals from other data because no other data segments within the communication system protocol are encoded with odd parity.

FIG. 1A shows that mobile nodes 101 and 102 are within the line-of-sight of station node 103's infrared collector/transmitter (110). Upon receiving an availability signal from station node 103, the controllers (106, 107) within each mobile node register the identity of the transmitting station node (103). Then, in order to effect a data communication with external network 105, each mobile node transmits a contention data segment that identifies the transmitting mobile node and provides contention information. For reasons that will become evident, each bit within a contention data segment has a duration of $t_c$, that is on the order of three to four times as long as the bits that make up the preamble and data payload. The transmission of these data sequences is initiated by mobile nodes 101 and 102 so that each is synchronized or framed with the next periodic transmission of an availability signal by station node 103.

As the transmissions from both mobile nodes are synchronized, station node 103 will receive each bit of the contention data segment transmitted from mobile station 101 at approximately the same time as a corresponding bit of the contention data segment transmitted from mobile node 102 is received. Upon receipt of the contention data sequences from mobile nodes 101 and 102 by infrared collector/transmitter 110, each bit of information contained in them is passed to controller 112, and a determination is made as to which mobile node will establish communications with external network 105.

This determination is based upon differentiating the contention data segments received from mobile nodes 101 and 102, and logically ORing the resultant signals (a process performed by the photodetector within infrared collector/transmitter 110). This essentially ORs the logical level transitions of mobile node 101's contention data segment with the logical level transitions of mobile node 102's contention data segment. As the bits of these contention data segments are detected, differentiated, and ORed by infrared collector/transmitter 110, an indication of the resulting ORed bit transition value is transmitted to controller 112. In response, controller 112 modulates infrared collector/transmitter 110 to produce a like signal transition—echoing the ORed contention bit back to mobile nodes 101 and 102. Each echoed bit is received and detected by the node infrared collector/transmitters at the respective mobile nodes, and the processor within each mobile node compares the received ORed contention bit with the contention bit currently being transmitted by that particular mobile node. The detection, differentiating, ORing, and echoing of a contention bit by station node 103, as well as a mobile node's comparison of the echoed bit to the contention bit being transmitted is all accomplished within the duration of one contention bit ($t_c$). The time $t_c$ is purposely fixed to be three to four times as long as each of the bits that make up the preamble data segments in order to allow these functions and comparisons to be effected within a single contention bit time. If a given mobile node receives an echoed contention bit that matches the contention bit presently being transmitted by that mobile node, that mobile node continues contending for contact with external network 105 by transmitting the next bit of its contention data segment. Contrastingly, if the echoed bit differs from the contention bit being transmitted by the mobile node, then that mobile node ceases transmission and drops out of contention until the next transmission of an availability signal by a station node.

The final bit of the contention data segment transmitted by mobile nodes is always fixed to be a logical 0. During this 0 bit a mobile node will not be producing an infrared signal, and this serves to provide a guard time of infrared "darkness" to insure that nothing transmitted by a mobile node during contention will interfere with the transmission of a data payload that may be transmitted from station node 103. Although the mobile nodes and the station node are synchronized, small variations in timing may arise due to variations in controller and node processing times, and the 0 bit at the end of the contention data segment provides a guard against inadvertent contention/data payload overlap.

Upon receipt of nine echoed contention bits that matched each of the contention bits that it had transmitted, the processor in mobile node 101 would send a data payload and a packet terminator. The data payload, containing information to be transferred to external network 105, would then be passed by controller 112 to external network 105. Ideally the first bit of this data payload should always be a logical 1. This insures that there will always be a transition from a logical 0 to a logical 1 at the beginning of a payload (as the contention bit always terminates with a logical 0 bit), and this transition can be utilized to precisely synchronize the station infrared collector/transmitter with the data being received from a mobile node.

The packet terminator that denotes the end of a data payload performs a function similar to that of the 0 bit that terminates a contention data segment. The packet terminator is 0 bit that is three to four times as long as the bits that make up the preamble and payload, and provides a guard time of infrared "darkness" to insure that nothing transmitted by the mobile node or the station infrared collector/transmitter interferes with the transmission of the next availability signal and/or preamble. This guard time is necessitated by the small variations in timing may arise due to variations in controller and node processing times.

Transmissions of data from station node 103 to mobile node 101 would be accomplished in a manner very similar to that described above. To initiate such a transmission, station node 103 would participate in a contention as though it were a mobile node, employing its own contention data segment. If station node 103 wins the contention none of the contending mobile nodes would receive an echoed contention signal that matches the ones they had transmitted, and immediately following the transmission of the final contention bit, station node 103 would transmit a data payload and packet terminator. Embedded in this data payload is a code identifying the intended recipient mobile node. This data payload and packet terminator would obviously be received by any and all mobile nodes in a line-of-sight with the transmitting station node's infrared collector/transmitter. However, each mobile node receiving the transmitted data payload checks the embedded identifying code of the payload to determine if it is the intended recipient of the received data payload. An intended recipient mobile node would accept and/or retain the remainder of the incoming data payload; all other recipient mobile nodes would ignore or discard remainder of the data payload.

If additional data packets are to be transmitted or received by mobile node 101, another contention is entered into following the transmission of the packet terminator and the receipt of another availability signal (a preamble sequence transmitted from a station node). Assuming that mobile node 101 remains in line-of-sight with infrared collector/transmitter 110, the transmission of an availability signal should immediately follow the transmission of the packet terminator bit. This perfect framing occurs because the interval between the transmission of availability signals by a station node is fixed at tpacket. If mobile terminal 101 wins the contention, the next data payload will be passed to or from external network 105. If however mobile node 101 loses the contention, the data payload to be sent is held in a buffer until the next data frame in which mobile node 101 obtains a connection with external network 105.

Figure 1B:
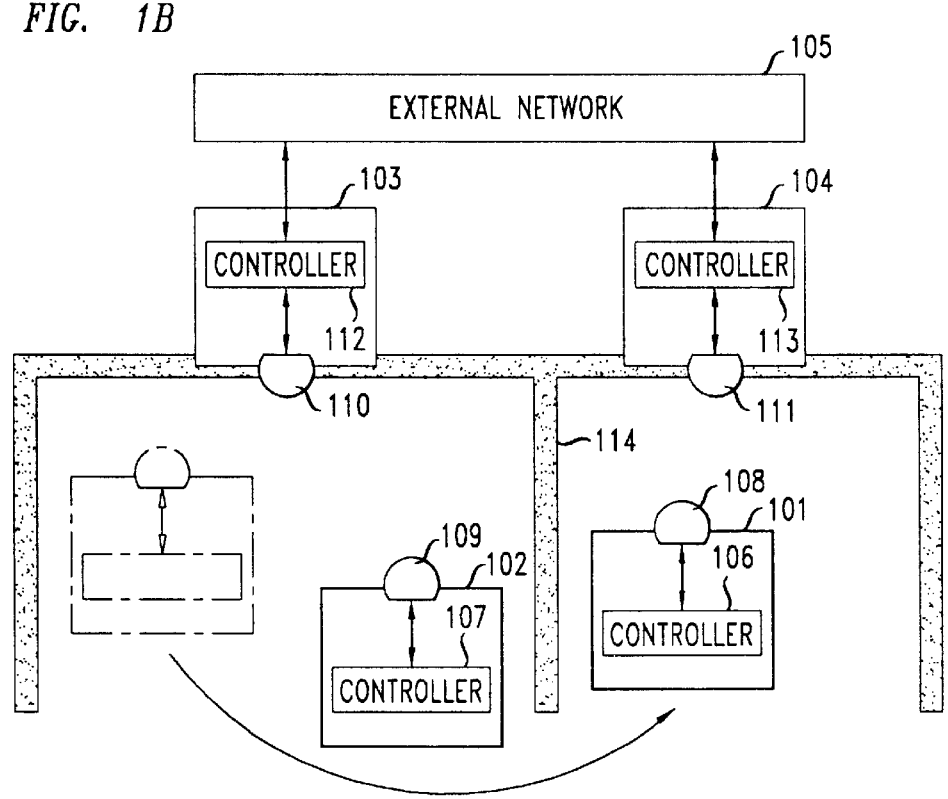
FIG. 1B is a simplified diagram depicting an alternate arrangement of the system of FIG. 1.

FIG. 1B shows the system of FIG. 1A where mobile node 101 has been removed from the line-of-sight of infrared collector/transmitter 110 and brought into line-of-sight with station node 104's infrared collector/transmitter (111). As stated earlier, the availability signal transmitted by each station within the data communication system uniquely identifies that station from any adjacent stations. This being the case, infrared collector/transmitter 111 will be transmitting a different availability signal than infrared collector/transmitter 110. Station node 104 may also be transmitting and accepting data packets that are not framed in synchronization with the packets being sent to and from station node 103. Therefore, any attempt by mobile node 101 to exchange data with station node 104 employing the same framing used to contact station node 103 would probably fail. However, after receiving an availability signal from station node 111, controller 106 within mobile node 101 would recognize the different preamble, and synchronize the next transmitted contention data segment with the framing of station node 104. Communication with external network 105 would then be contended for and carried out in a manner similar to that described for station node 105.

It will be understood that the particular system and method described above is only illustrative of the principles of the present invention, and that various modifications could be made by those skilled in the art without departing from the scope and spirit of the present invention, which is limited only by the claims that follow. One modification would include optically linking one or more mobile infrared collector/transmitters to a station infrared collector/transmitter via an optical fiber or other fixed conduit. Another modification would utilize data packets having a different format or structure. One such different format would be packets having a fixed overall length and format, but differing in the particular number of bits per data segment and/or the number of data segments per packet with respect to the particular format described above. It is also envisioned that the particular configuration of the mobile nodes employed in practicing the invention would be adapted to suit particular applications. In some applications a personal computer, such as a laptop, may be adapted to serve as a mobile node; while other applications may dictate that the mobile node be a more simplistic device that could be incorporated into a badge or a wristband worn by an individual. The invention may also be applied to systems where one or more of the station or mobile nodes are adapted to operate in a receive only, or transmit only mode with respect to data communications. For example, a mobile node that is worn as a badge may be configured to only transmit data to a station node (either on a periodic basis, or in response to some action by the wearer). The invention can also be applied to data communications systems where station nodes transmit availability signals at irregular intervals, based upon network use and availability.

What is claimed is:

1. A contention method comprising the steps, performed at each of a plurality of contenders for access to a shared resource, of:

transmitting to an infrared transceiver an individual one of a predetermined sequence of infrared signals that is unique to each of said contenders;

receiving an answering signal from said infrared transceiver in response to the transmission of said individual signal; and continuing to carry out said transmitting and receiving steps using subsequent signals of said sequence only if the previously transmitted signal bears a predetermined relationship to the answering signal that was received in response thereto, and dropping out of said contention method otherwise;

seizing control of said resource when said transmitting and receiving steps are carried out a predetermined number of occurrences while the previously transmitted signal bears a predetermined relationship to the answering signal that was received in response thereto.

2. The contention method of claim 1 wherein said predetermined sequence of infrared signals, unique to each of said contenders, is transmitted to said infrared transceiver in response to the reception of an availability signal from said infrared transceiver.

3. The contention method of claim 1 wherein upon seizing control of said resource said contender transmits a data packet of predetermined length to said infrared transceiver.

4. The contention method of claim 1 wherein said predetermined sequence of infrared signals represent digital signals.

5. The contention method of claim 4 wherein said predetermined relationship between said previously transmitted signal and said answering signal received in response thereto is an identity of logical state.

6. The contention method of claim 1 wherein said shared resource is a communication channel providing a link to an external network.

7. The contention method of claim 1 wherein said infrared transceiver enters into contention for control of said shared resource by:

generating one of a predetermined sequence of signals, unique to said infrared transceiver;

comparing said generated one of a predetermined sequence of signals to said answering signal; and continuing to carry out said generating and comparing steps using subsequent generated signals of said sequence unique to said infrared transceiver only if the previously generated signal bears a predetermined relationship to the answering signal being compared thereto, and dropping out of said contention method otherwise; and seizing control of said resource.

8. The contention method of claim 1 wherein the predetermined relationship is matching of the answering signal and the individual one of the predetermined sequence of infrared signals, and the answering signal is a logical OR combination of the individual one of the predetermined sequence of infrared signals from each the plurality of contenders.

9. The contention method of claim 1, further comprising the step of seizing control of said resource when said transmitting and receiving steps are carried out a predetermined number of occurrences while the previously transmitted signal bears a predetermined relationship to the answering signal that was received in response thereto.

10. A system facilitating access to a shared resource, comprising:

a central infrared transceiver, adapted to send and receive infrared signals;

a plurality of contending nodes, each adapted to transmit to said infrared transceiver an individual one of a predetermined sequence of infrared signals that is unique to each of said contending nodes, and to receive infrared signals from said central infrared transceiver in response thereto;

a contention means, linked to said central infrared transceiver, adapted to instruct said central infrared transceiver to generate an answering signal in response to the reception of said individual one signal transmitted by each of said contending nodes; and control means, associated with each of said contending nodes, adapted to instruct said associated contending node to transmit subsequent signals of said sequence only if the previous signal transmitted by said associated contending node bears a predetermined relationship to the answering signal generated by said central infrared transceiver in response thereto, and further adapted to instruct said associated contending node to cease contending for said shared resource otherwise, and further adapted to seize control of the shared resource when the transmitting and receiving are carried out a predetermined number of occurrences while the previously transmitted signal bears a predetermined relationship to the answering signal that was received in response thereto.

11. The invention of claim 10 wherein said optical signals transmitted by said plurality of contending nodes represent digital signals.

12. The invention of claim 9, wherein said contention means comprises a means for optically combining optical signals received from said plurality of contending nodes so as to perform a logical OR operation upon the combined signals.

13. The invention of claim 9, wherein said predetermined relationship between said previously transmits signal and said answering signal is an identity of logical state.

14. The invention of claim 10 wherein said shared resource is a communication channel providing a link to an external network.

15. The invention of claim 10 wherein said central infrared transceiver enters into contention for control of said shared resource by:

generating one of a predetermined sequence of signals, unique to said central infrared transceiver;

comparing said generated one of a predetermined sequence of signals to said answering signal; and continuing to carry out said generating and comparing steps using subsequent generated signals of said sequence unique to said infrared receiver only if the previously generated signal bears a predetermined relationship to the answering signal being compared thereto, and dropping out of said invention otherwise; and seizing control of said resource.

16. The invention of claim 15 wherein upon seizing control of said resource said infrared receiver transmits a data packet of predetermined length to one or more of said contending nodes.

17. The invention of claim 9, wherein said control means is further adapted to seize control of said resource when said transmitting and receiving steps are carried out a predetermined number of occurrences while the previously transmitted signal bears a predetermined relationship to the answering signal that was received in response thereto.

18. The invention of claim 10 wherein said control means is further adapted to instruct an associated contending node to seize control of said shared resource upon transmitting a last individual signal in said predetermined sequence of signals, and the subsequent reception of an answering signal having a predetermined relationship thereto.

19. A method comprising the steps of:

transmitting, by each of a plurality of contenders of a shared resource, an individual signal of a predetermined sequence of signals, wherein each of the plurality of contenders has a unique predetermined sequence of signals;

receiving an answering signal that is based, at least in part, on the individual signal of the predetermined sequence of signals;

while the answering signal and the individual signal of the predetermined sequence of signals have a predetermined relationship, continuing the transmitting and receiving steps with a subsequent individual signal in the predetermined sequence;

when the answering signal and the predetermined sequence of signals do not have the predetermined relationship, dropping out of contention;

seizing control of the shared resource when the transmitting and receiving steps are carried out a predetermined number of occurrences while the previously transmitted signal bears a predetermined relationship to the answering signal that was received in response thereto.

* * * * *